United States Patent [19]

Tornero et al.

[11] Patent Number: 5,801,211
[45] Date of Patent: Sep. 1, 1998

[54] RESILIENT FIBER MASS AND METHOD

[75] Inventors: Roger Tornero; S. David Gray, both of Greensboro, N.C.

[73] Assignee: CINCO, Inc., Greensboro, N.C.

[21] Appl. No.: 725,508

[22] Filed: Oct. 4, 1996

[51] Int. Cl.$^6$ ................................................. C08G 18/04
[52] U.S. Cl. .................. 521/159; 264/45.3; 264/45.8; 264/257; 428/245; 428/288; 428/304.4; 428/308.4; 428/423.1
[58] Field of Search ................ 264/45.3, 45.8, 264/257; 428/245, 308.4, 304.4, 423.1, 288; 521/159

[56] References Cited

U.S. PATENT DOCUMENTS

| | | |
|---|---|---|
| 4,171,391 | 10/1979 | Parker . |
| 4,332,710 | 6/1982 | McCartney . |
| 4,376,148 | 3/1983 | McCartney . |
| 4,448,922 | 5/1984 | McCartney . |
| 4,496,624 | 1/1985 | McCartney . |
| 4,511,605 | 4/1985 | McCartney . |
| 4,668,562 | 5/1987 | Street . |
| 4,902,542 | 2/1990 | Minegishi et al. . |
| 4,944,992 | 7/1990 | Yoneshige et al. . |
| 5,021,286 | 6/1991 | Minegishi et al. . |
| 5,149,567 | 9/1992 | Minegishi . |

*Primary Examiner*—John M. Cooney, Jr.

[57] ABSTRACT

A resilient fiber mass and method of forming the same is provided whereby a conventional batting is sprayed with a polyurethane prepolymer and is then in one embodiment rolled into a tight cylindrical shape for subsequent molding. A steam catalyst is introduced into a mold having a specific shape which causes the prepolymer to foam and polymerize. The foaming action separates the fibers at the intersections to provide resiliency to the fiber mass. The molded mass is then removed and can, for example, be attached to a chair seat and covered with decorative fabric as is standard in furniture manufacturing. The chair cushion so formed is highly resilient and durable.

20 Claims, 4 Drawing Sheets

RESILIENT FIBER MASS AND METHOD

BACKGROUND OF THE INVENTION

1. Field of the Invention

The invention herein pertains to resilient fiber masses and methods for producing the same from fiber battings treated with polyurethane foam.

2. Description of the Prior Art and Objectives of the Invention

It is well-known in the art that the characteristics of a fiber batting or web can be changed and improved by impregnating the web with a resinous material to change the physical properties. U.S. Pat. No. 4,496,624 describes various polymeric compositions used for these purposes. Also, various fabrics are described in U.S. Pat. No. 4,448,922 which are used with polyurethane dispersions to improve the surface characteristics of the end product. Fiber batt coating techniques are described in U.S. Pat. Nos. 4,367,148, 4,511,605, 4,332,710 and 4,171,391, certain of which utilize polyurethane resins such as U.S. Pat. Nos. 4,511,605 and 4,332,710. U.S. Pat. Nos. 4,902,542 and 4,944,992 provide a cushion formed from fibers with a polyurethane resin binding the fibers at the intersection. U.S. Pat. Nos. 5,021,286 and 5,149,567 demonstrate methods of impregnating intertwined fibers with urethane polymer emulsions to maintain the fibers in place by binding the intersections thereof. Nevertheless, these patents do not provide the advantages and benefits of the present invention for forming a highly resilient mass which may be used as padding in the production of arms, backs and cushions in automotive interiors and furniture.

It is understood in the industry that polyester fiber batting can be used as a padding material, however, such batting exhibits very poor shape retention and low resiliency. Consequently very large amounts of batting are generally compressed into upholstering envelopes in order to obtain a sufficient degree of padding. Attempts have been made at enhancing the physical properties of polyester fiber batting by introducing low melt fibers onto the batting and then heating it, to thus obtain a bonded network of fibers. While some improvement in the shape retention properties may be noticeable, the product so produced is generally "boardy" in feel and its properties are still not adequate to fulfill the comfort and aesthetic appeal required by most furniture and bedding manufacturers.

It is therefore one objective of the present invention to provide a method for producing a fiber mass having reduced deformability and increased resiliency by the process of treating a fiber batting with a foamable prepolymer in a hydrocarbon solvent-free continuous process.

It is still another objective of the present invention to provide a method to improve the resiliency of fiber batting by spraying a foamable polyurethane prepolymer onto garnetted needle punched, or similarly prepared, fiber batting and then polymerizing and foaming the prepolymer with steam to provide a fiber mass with the fiber separated by foamed polymer.

It is a further objective of the present invention to provide a process for forming a furniture seat or other article by molding a coated fiber batting with steam having small amounts of a tertiary amine therein and with traces of dimethylsiloxane in the prepolymer to enhance the foaming properties.

It is yet another objective of the present invention to provide an economical method of producing a highly resilient furniture cushion or other article by first spraying a fiber batting with a foamable polyurethane prepolymer, folding and shaping the sprayed batting to conform to the interior dimensions of a mold, compressing the fiber batting within the mold, subjecting the mold contents to steam to crosslink or polymerize the foamable prepolymer, and thereafter removing the finished article from the mold.

Various other objectives and advantages of the present invention will become apparent to those skilled in the art as a more detailed description is set forth below.

SUMMARY OF THE INVENTION

The aforesaid and other objectives are realized by providing a resilient fiber mass as used in a chair seat comforter, cushioning, furniture, bed padding or otherwise, which will not easily deform and which is highly durable. The resilient fiber mass is manufactured by the process of coating a conventional fiber batting which may be, for example formed from air laid polyester fibers which are sprayed with a foamable polyurethane prepolymer. The treated (sprayed) fiber batting is then pressed together by means of a mechanical conveyor or mold to the desired density and load-bearing properties and is subjected to steam for polymerization for a few minutes. The fibers separate at the intersections as the prepolymer foams to form resilient intersections. The resilient mass thus produced may be cut, slit or otherwise portioned as needed for use in subsequent upholstering or quilting operations.

The foamable polyurethane prepolymer is conventionally formed by reacting a 3,000 molecular weight polyether polyol with toluene diisocyanate whereby the reaction yields a 20% free $N=C=O$ radicals liquid prepolymer having a viscosity in the range of 3,000–5,000 cps suitable for spraying purposes. The prepolymer liquid is then modified by adding less than 2% but more than 0.1% of a silicone surfactant such as L-520 (supplied by Union Carbide). The foamable prepolymer liquid blend thus produced is then placed in a conventional spraying apparatus. After spraying, the fiber batting is then processed either by a continuous method consisting of compressing the fiber batting and subjecting it to steam, which may contain less than 5% but more than 0.1% of a tertiary amine catalyst, or a batch method which consists of placing the prepolymer sprayed fiber batting in a mold, subjecting it to steam for foaming (polymerization) and cutting suitable portions from the resilient fiber mass formed, or placing sheets cut from the sprayed batting into a suitably shaped mold for polymerization to obtain specific shaped articles such as cushions. During polymerization foaming occurs which separates the fibers, forming highly resilient fiber intersections.

DESCRIPTION OF THE PREFERRED EMBODIMENT

Figure 2:
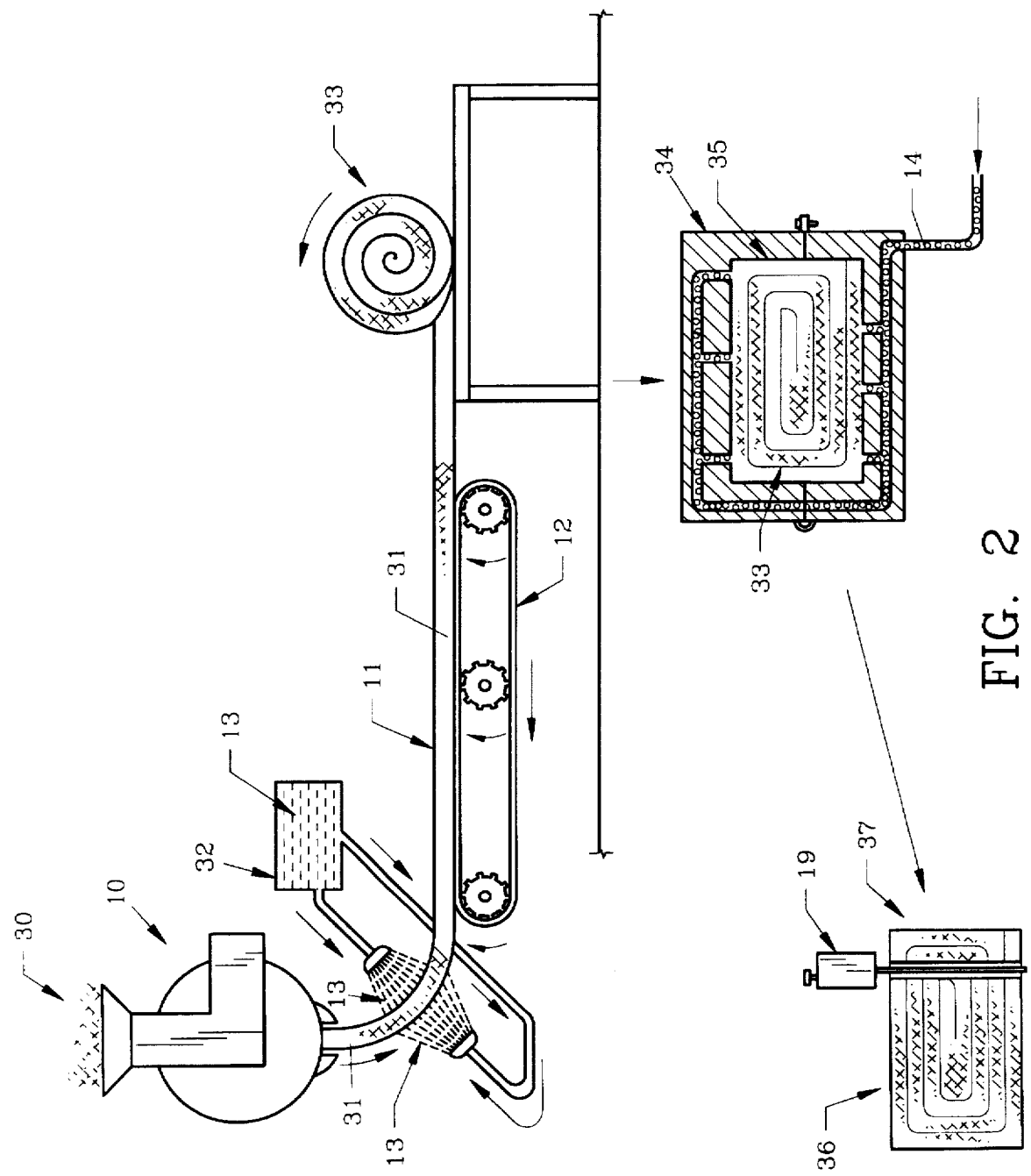
FIG. 2 illustrates the preferred method of the invention in which a fiber batting is sprayed with a modified foamable prepolymer, the sprayed batting rolled into a coil which is then placed into a mold for shaping and polymerizing, and subsequent slitting of the foamed polymerized resilient mass to desired size portions.

The preferred method of the invention is shown in FIG. 2 which schematically demonstrates an opened and blended polyester fiber mixture delivered to a web or batt forming machine such as a garnet or other type of air-laid web forming machine. In this method, the thickness of the fiber batting formed will be approximately ½ to ¾ of one inch (1.3–1.9 cm) thick, with a square foot (0.09 m$^2$) of the fiber batting weighing approximately ¼ of an ounce (8.5 gm). However, an air laying machine, such as a Rando webber, can be used to form a thicker, single layer batting if desired. The fiber batting is sprayed on both sides with a hydrocarbon solvent-free foamable polyurethane prepolymer and is rolled into a cylindrically-shaped mass. The mass is then placed in a mold having a rectangular cavity, where it is compressed to the desired density, preferably 1.1 to 2.5 pcf. Steaming for one minute causes foaming and polymerization to occur. The polymerized, preferred resilient fiber mass so formed is then removed and cut to desired portions, which can be used for cushions, furniture padding or the like as the intersections of the fibers separate upon foaming to provide high resiliency of the fiber mass.

In the most preferred method, a standard needle punched fiber batting having a thickness of approximately six millimeters, a width of 1 meter and a length of 3 meters is continuously formed from polyester fibers having a denier of 2–6 with an average length of 75 mm. The fiber batting is driven on a conventional motorized conveyor at an appropriate speed past spray heads which are in fluid communication with a liquid-containing tank holding a crosslinkable, foamable liquid polyurethane prepolymer. The prepolymer in the preferred embodiment, consists of a liquid polyurethane as is conventional in the art formed by reacting a 3,000 molecular weight polyether polyol with toluene diisocyanate to yield a 20% N=C=O free radicals liquid prepolymer having a viscosity of 3,000–5,000 centipoises (cps) at 70° F. The prepolymer is modified by the addition of 0.1–2% silicone surfactant. The liquid modified foamable prepolymer is sprayed onto the fiber batting in a weight ratio of fiber to prepolymer of 1:1. The resulting density of the batting with prepolymer is most preferably 1.8 pounds per cubic foot. Next, after the sprayed fiber batting is removed from the conveyor it is placed on a table where it is manually rolled into a properly sized coiled cylinder. The cylinder is next placed in a mold and steam at 220° F. is used to polymerize and foam the polyurethane prepolymer. The resultant resilient fiber mass so formed is removed from the mold and can then be cut into selected size portions for use as cushions, paddings or otherwise.

The chemistry of the foamable prepolymer will also determine the end physical properties of the desired resilient mass, with higher molecular weight polyols yielding fiber masses with lower load-bearing properties, and while toluene diisocyanate is the preferred isocyanate because of its reactivity, it is also possible to use other commercially available aromatic and aliphatic isocyanates and mixtures thereof. Additionally, co-spraying a reactive mixture of a polyether polyol formulated to polymerize the reactive isocyanate portion of the formulation yields a desirable, resilient mass. While utilizing this method it is possible to enhance the formation of cellular structures within the fiber mass rather than the development of an elastomeric coating typical of the method that utilizes only the prepolymer and steam. The foaming prepolymer mixture during polymerization causes the fibers to separate at the intersections, thus forming a more resilient fiber mass than by usual methods of merely adhering the fibers together.

DETAILED DESCRIPTION OF THE DRAWINGS AND OPERATION OF THE INVENTION

Figure 1:
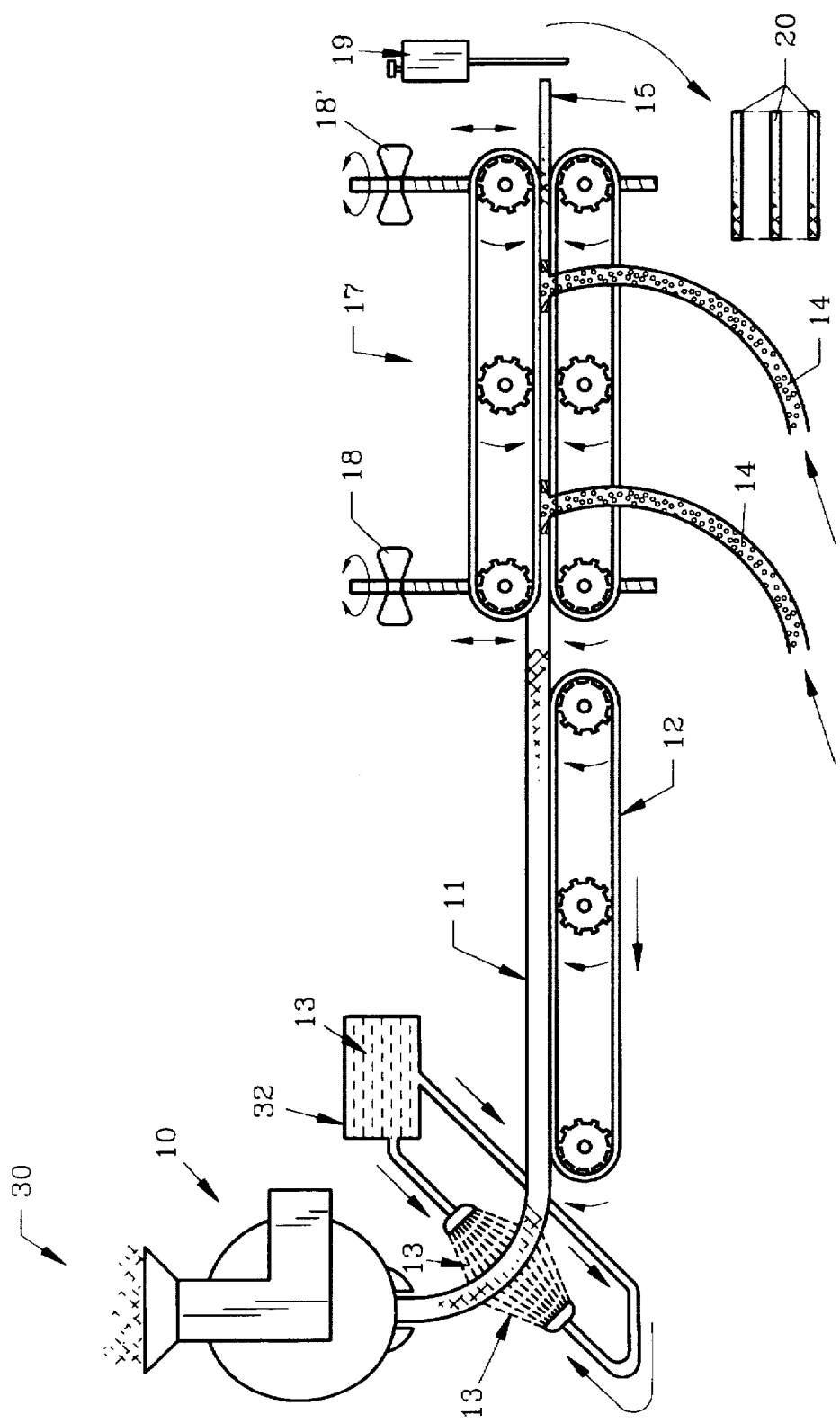
FIG. 1 demonstrates one method of the invention with a conventional fiber batting being coated with a modified foamable prepolymer, compression of the sprayed batting by a conveyor and steam treatment for foaming and polymerization and slitting the resulting thin fiber mass to desired lengths.
Figure 4:
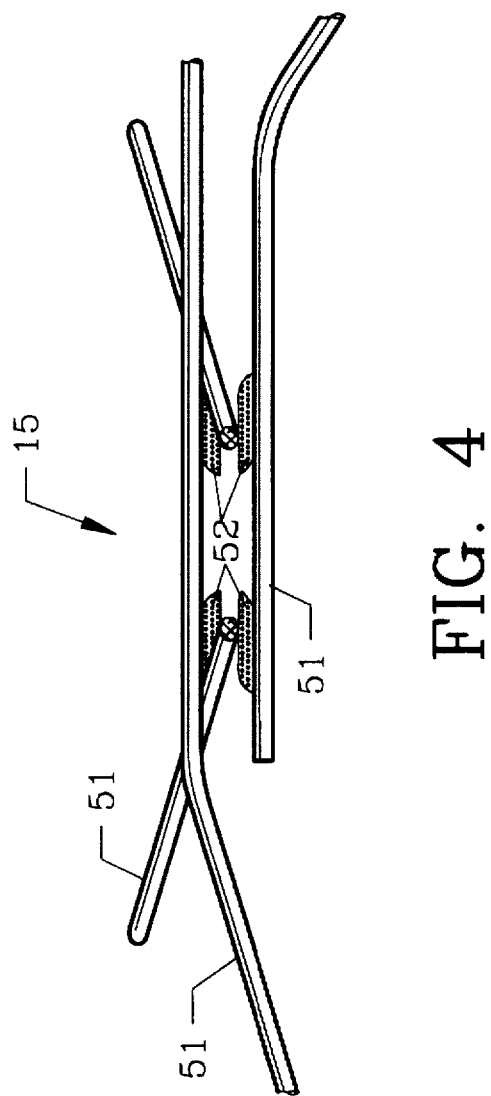
FIG. 4 depicts an enlarged schematic view of a few of the fibers of the fiber mass to illustrate the separated fibers and resilient intersections with the polyurethane foam.

For a better understanding of the invention, turning now to the drawings, three distinct manufacturing techniques are described:

In FIG. 1 fiber batting 11 from standard garnet machine 10 continues along conveyor 12 after being sprayed with a modified foamable prepolymer 13 where it is compressed to obtain a desired density, preferably 1.2 to 2.0 pcf by means of adjustable tension conveyor 17 having manual pressure handles 18, 18'. Fiber batting 11 is also subjected to steam 14 during compression for a period of approximately one minute. After exiting from the steaming (polymerizing) process resilient fiber mass 15 is then slit into desired lengths 20 by means of standard slitter 19, which may be a saw, laser beam, hot wire cutter or the like. Lengths 20 can be used for cushions and padding as usual in the furniture and related industries. An enlarged view of a portion of resilient fiber mass 15 is seen in FIG. 4 with fibers 51 separated by resilient polyurethane foam 52. While all fibers 51 may not be spaced apart by foam 52, a sufficient number are which greatly increases the resiliency of fiber mass 15.

In FIG. 2, the preferred method of the invention is shown whereby garnet machine 10 is loaded with polyester fibers 30 to produce fiber batting 31. Fiber batting 31 is sprayed on both sides with a modified foamable polyurethane prepolymer 13 as hereinbefore described from tank 32. The modified foamable prepolymer sprayed fiber batting is then manually rolled into coiled cylinder 33. Cylinder 33 is then placed in mold 34. Mold 34 includes an upper half and a lower half which are hingedly joined and latched during injection of steam 14. As would be understood, cylinder 33 is compressed and deforms to the shape of the internal rectangular cavity 35 of mold 34. As seen, mold 34 includes a substantially rectangular cavity 35 although other shapes and configurations may be used. The resultant resilient fiber mass 36 (similar ro fiber mass 15 as seen in FIG. 4) formed is then removed and a standard slitter 19 can be used to cut desired size portions such as portion 37 seen therein. Once cut, portion 37 can be used as a furniture cushion, padding or otherwise and as needed.

Figure 3:
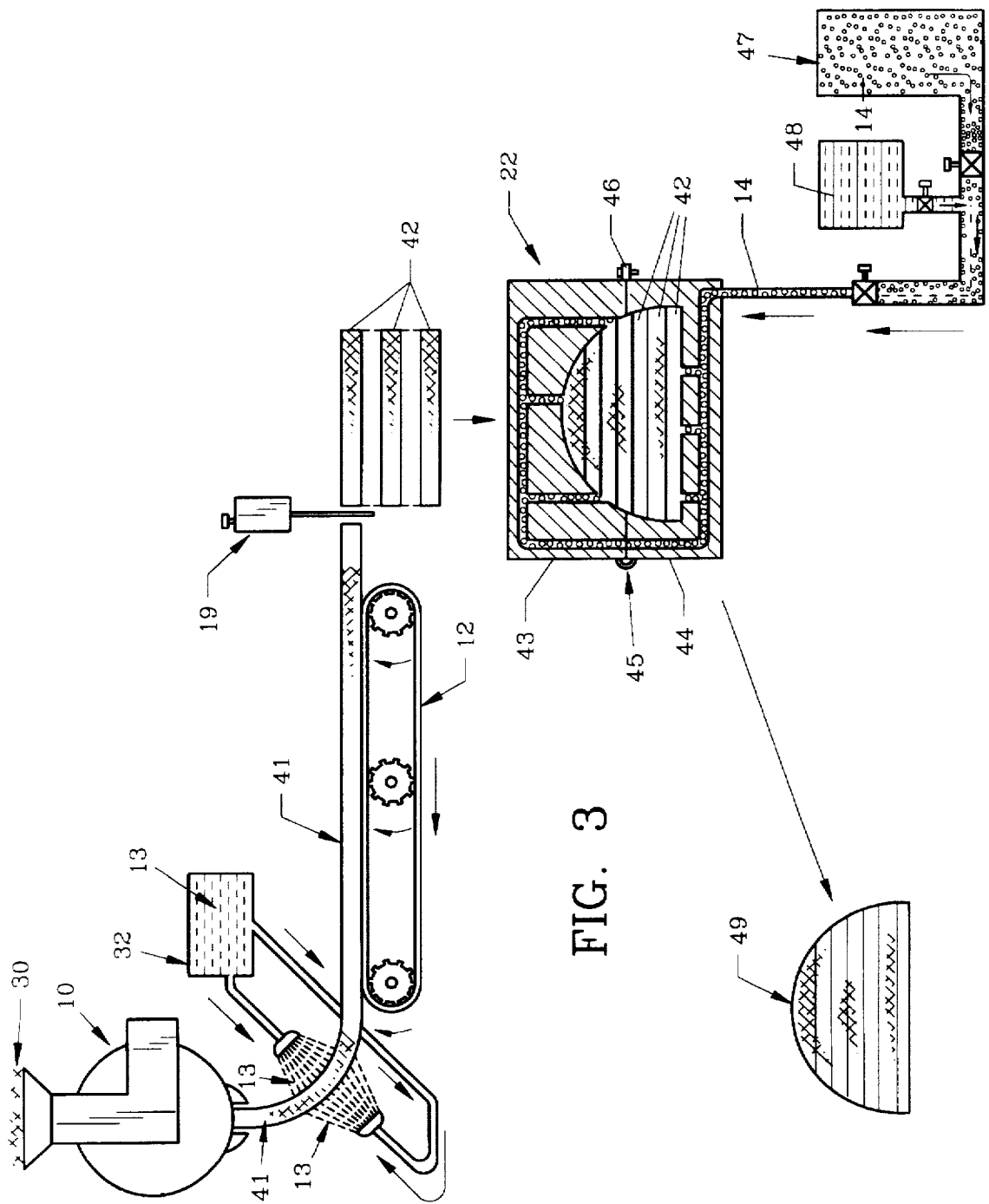
FIG. 3 shows another method of spraying a conventional fiber batting with a modified, foamable prepolymer, slitting the sprayed batting to desired lengths and molding the slit sections to a specific resilient mass shape.

In another embodiment of the invention, as seen in FIG. 3, garnet machine 10 forms fiber batting 41 which is sprayed with a modified foamable prepolymer mixture 13, as described in FIG. 2, and passes along conveyor 12 to slitter 19. Slitter 19 cuts sprayed fiber batting 41 into desired lengths 42 which are then placed within mold 22 which has a specific shaped cavity, as seen in FIG. 3, for a particular article. Mold 22 consists of an upper mold portion 43 and a lower mold portion 44 with hinge 45 and latch 46. Once the mold has been loaded with sprayed fiber batting sections 42, it is then closed and latched as shown in the schematic cross-sectional view. Next, a conventional steam source (schematically shown at 47) delivers steam at 220° F. which is mixed with trace amounts of a standard tertiary diamine catalyst 48 (approximately 1% of prepolymer 13 weight contained in mold 22). Steam 14 is directed to mold 22 for approximately three minutes. The resilient fiber mass 49 thus produced is thereafter removed and has a resiliency comparable to polyurethane foam having the same approximate density thereof.

Other specific examples of the methods are as follows:

EXAMPLE 1

A randomly arranged mixture of polyester fibers having an average denier of 15 and average length of 12 inches and containing 10% by weight of low melt polyethylene fibers having an average denier of 9 to 75 mm in length was sprayed with a modified foamable polyether urethane prepolymer. The foamable prepolymer is prepared by reacting a 6500 MW triol with toluene diisocyanate to obtain 10% free N=C=O radicals. The resulting mass consisted of 80% fibers and 20% polyurethane by weight. The mass is placed in a perforated metal cavity and compressed to a density of 1.4 pcf. The mass was then subjected to steam vapors for a period of two minutes for foaming and polymerization. After drying for a period of 24 hours, the mass was tested for resiliency and height retention after conventional cycle pounding to 30% of its original height. The results of the test indicate that the product exhibited physical properties slightly below the expectations of virgin polyurethane foam but far superior to the characteristics of conventional polyester batting.

EXAMPLE 2

An air laid polyester fiber batting having a thickness of 10 mm, an average denier size of 5 and fiber length of 75 mm, was sprayed with a foamable polyether urethane prepolymer consisting of a 4000 MW triol reacted with MDI to obtain 18% free N=C=O radicals and 0.5% of a conventional silicone surfactant as used in the urethane foam industry to enhance foaming and control cell formation. The fiber mass was folded onto itself and placed in a perforated metal cavity mold to a density of 1.8 pcf. The mass was then subjected to steam which had 1.0% by weight of a tertiary diamine catalyst, for a period of three minutes. Upon removal, very small foamed cell formations having dimensions from 0.5 to 2.0 mm in diameter were noticed throughout the fiber network. The resilient mass appears to have a resiliency similar to comparable polyurethane foam.

EXAMPLE 3

A 0.5 inches thick garnetted polyester fiber batting was sprayed with the same prepolymer as described in the method of FIG. 2 above at a ratio of 60% fiber and 40% foamable urethane prepolymer. The fiber mass was placed on a perforated metal tool that had the shape of a back cushion and compressed by the mold lid to a density of 1.2 pcf. It was then subjected to steam for a period of one minute for foaming and polymerization. The article was demolded and allowed to dry for a period of two hours. It showed desirable characteristics of shape retention and was adequate for use as a chair back.

Those skilled in the art will recognize several modifications to the above-described process, foamable prepolymers and fibers which may enhance the properties or change the characteristics of the resilient mass which is so formed combinations of polypropylene and polyester fibers, recycled fibers and others may be utilized as desired. Thus, the examples presented are merely for explanatory purposes and are not intended to limit the scope of the appended claims.

We claim:
1. A method of forming a resilient mass comprising the steps of:
   a) forming a loose fiber batting;
   b) spraying said fiber batting with a foamable prepolymer;
   c) placing the sprayed fiber batting into a mold;
   d) introducing steam into the mold;
   e) reacting the foamable prepolymer with the steam;
   f) foaming the prepolymer; and
   g) separating the fibers of the batting as the prepolymer foams to form a resilient fiber mass.

2. The method of claim 1 and including the step of removing the resilient mass from the mold.

3. The method of claim 1 wherein spraying a fiber batting comprises spraying a polymeric fiber batting.

4. The method of claim 3 wherein spraying a polymeric fiber batting comprises spraying a polyester fiber batting.

5. The method of claim 1 wherein spraying a fiber batting comprises spraying a fiber batting having fibers with a 2–6 denier size and having a fiber length of about 75 mm.

6. The method of claim 1 wherein forming a fiber batting comprises forming a garnetted batting.

7. The method of claim 1 wherein forming said fiber batting comprises forming a needle punched fiber batting.

8. The method of claim 1 wherein said foamable prepolymer comprises a pre-polymer formed from a polyurethane polyol reacted with a toluene diisocynate.

9. The method of claim 8 wherein spraying a foamable prepolymer comprising spraying a prepolymer having a viscosity of about 3000–5000 cps.

10. The method of claim 1 wherein placing said fiber batting into a mold comprises the step of placing said fiber batting into a mold having a rectangular cavity.

11. The product formed from the process of claim 1.

12. The product formed from the process of claim 3.

13. The method of claim 1 and including the step of introducing an effective amount of a dimethylsiloxane into the foamable polyurethane prepolymer.

14. A method of molding a fiber mass having increased resiliency and reduced deformability comprising the steps of:
   a) coating a fiber batting formed from fibers having lengths of about 75 mm and denier in the range of from 2 to 6 with a foamable prepolymer;
   b) placing the coated batting into a mold,
   c) introducing steam into the mold;
   d) reacting the foamable prepolymer with the steam;
   e) foaming the prepolymer; and
   f) separating the fibers of the batting as the prepolymer foams to form a resilient fiber mass.

15. The method of claim 14 wherein heating the mold with steam comprises heating the mold with steam having a temperature of about 220° F., for five minutes.

16. A fiber mass comprising: randomly laid fibers, resilient foamed polyurethane, said foamed polyurethane positioned between said fibers to separate the same and to provide resiliency at the fiber intersections.

17. The fiber mass of claim 16 wherein said randomly laid fibers comprise polyester fibers.

18. The method of claim 1 wherein said foamable prepolymer has a viscosity in the range of 3,000 to 5,000 cps.

19. The method of claim 14 wherein said foamable prepolymer has a viscosity in the range of 3,000 to 5,000 cps.

20. The method of claim 4 wherein said foamable prepolymer has a viscosity in the range of 3,000 to 5,000; cps;

wherein forming a fiber batting comprises forming a garnetted batting;

wherein said foamable pre-polymer comprises a pre-polymer formed from a polyurethane polyol reacted with a toluene diisocynate;

and including the steps of:

removing the resilient mass from the mold after molding; and introducing an effective amount of dimethylsiloxane into the foamable polyurethane prepolymer.

* * * * *